US006852658B2

(12) United States Patent
Peuchert et al.

(10) Patent No.: US 6,852,658 B2
(45) Date of Patent: Feb. 8, 2005

(54) FLAT PANEL LIQUID-CRYSTAL DISPLAY, SUCH AS FOR A LAPTOP COMPUTER

(75) Inventors: Ulrich Peuchert, Mainz (DE); Peter Brix, Mainz (DE)

(73) Assignee: Schott Glas, Mainz (DE)

( * ) Notice: Subject to any disclaimer, the term of this patent is extended or adjusted under 35 U.S.C. 154(b) by 145 days.

(21) Appl. No.: 09/758,952

(22) Filed: Jan. 11, 2001

(65) Prior Publication Data

US 2001/0034294 A1 Oct. 25, 2001

(30) Foreign Application Priority Data

Jan. 12, 2000 (DE) .......................................... 100 00 838

(51) Int. Cl.[7] .......................... C03C 3/093; C03C 3/091
(52) U.S. Cl. ............................. 501/67; 501/66; 501/65
(58) Field of Search ............................... 501/65, 66, 67

(56) References Cited

U.S. PATENT DOCUMENTS

| | | | |
|---|---|---|---|
| 4,824,808 A | 4/1989 | Dumbaugh, Jr. | |
| 5,116,787 A | 5/1992 | Dumbaugh, Jr. | |
| 5,116,789 A | 5/1992 | Dumbaugh, Jr. et al. | |
| 5,374,595 A | 12/1994 | Dumbaugh, Jr. et al. | |
| 5,489,558 A | 2/1996 | Moffatt et al. | |
| 5,508,237 A | 4/1996 | Moffatt et al. | |
| 5,770,535 A | 6/1998 | Brix et al. | |
| 5,851,939 A | 12/1998 | Miwa | |
| 5,908,703 A | 6/1999 | Brix et al. | |
| 6,417,124 B1 * | 7/2002 | Peuchert et al. ............... | 501/86 |
| 6,465,381 B1 * | 10/2002 | Lautenschlager et al. ..... | 501/67 |
| 6,468,933 B1 * | 10/2002 | Narita et al. .................. | 501/56 |

FOREIGN PATENT DOCUMENTS

| | | | |
|---|---|---|---|
| DE | 3730410 | | 4/1988 |
| DE | 4213579 | | 10/1992 |
| DE | 19601022 | | 7/1997 |
| DE | 196 01 922 | * | 7/1997 |
| DE | 19601922 | | 7/1997 |
| DE | 19603689 | | 8/1997 |
| DE | 19680967 | | 12/1997 |
| DE | 19680966 | | 1/1998 |
| DE | 19739912 | | 12/1998 |
| EP | 0607865 | | 7/1994 |
| EP | 0672629 | | 9/1995 |
| EP | 0510544 | | 12/1995 |
| EP | 0714862 | | 6/1996 |
| EP | 0510543 | | 7/1996 |
| EP | 0953549 | | 11/1999 |
| EP | 1078893 | | 2/2001 |
| JP | 4160030 | | 6/1992 |
| JP | 8295530 | | 11/1996 |
| JP | 912333 | | 1/1997 |
| JP | 948632 | | 2/1997 |
| JP | 9100135 | | 4/1997 |
| JP | 9711919 | | 4/1997 |
| JP | 9711920 | | 4/1997 |
| JP | 9156953 | | 6/1997 |
| JP | 9169538 | | 6/1997 |
| JP | 9263421 | | 10/1997 |
| JP | 1025132 | | 1/1998 |
| JP | 1045422 | | 2/1998 |
| JP | 1059741 | | 3/1998 |
| JP | 1072237 | | 3/1998 |
| JP | 10114538 | | 5/1998 |
| JP | 10130034 | | 5/1998 |
| JP | 10139467 | | 5/1998 |
| JP | 10231139 | | 9/1998 |
| JP | 10324526 | | 12/1998 |
| JP | 2000159541 | | 6/2000 |
| WO | 9811919 | | 3/1998 |
| WO | 9811920 | | 3/1998 |
| WO | 9827019 | | 6/1998 |

OTHER PUBLICATIONS

Database WPI Section Ch, Week 199717 Derwent Publications Ltd., London, GB; Class L01, AN 1997–188222 XP002168035 & JP 09 048532 A (Nippon Electric Glass Co) Feb. 18, 1997.

Database WPI Section Ch, Week 199734 Derwent Publications Ltd., London, GB; Class L01, AN 1997–369217 XP002168036 & JP 09 156953 A (Nippon Electric Glass Co), Jun. 17, 1997.

Database WPI Section Ch, Week 200040 Derwent Publications Ltd., London, GB; Class L01, AN 2000–454638 XP002168037 & JP 2000 159541 A (Nippon Electric Glass Co), Jun. 13, 2000.

* cited by examiner

*Primary Examiner*—David Sample
*Assistant Examiner*—Elizabeth A. Bolden
(74) *Attorney, Agent, or Firm*—Nils H. Ljungman & Associates

(57) ABSTRACT

Flat panel liquid-crystal displays, such as for laptop computers. The displays include twisted nematic displays, supertwisted nematic displays, active matrix liquid-crystal displays, thin film transistor displays, and plasma addressed liquid-crystal displays. The displays are furnished with glass substrates. The glass substrates exhibit high resistance to thermal shock, a high transparency over a broad spectral range in the visible and ultra violet ranges and the glass being configured to be free of bubbles, knots, inclusions, streaks, and surface undulations, which glass substrates are made from alkali-free aluminoborosilicate glasses. There are also provided analogous thin-film photovoltaics.

20 Claims, No Drawings

FLAT PANEL LIQUID-CRYSTAL DISPLAY, SUCH AS FOR A LAPTOP COMPUTER

CROSS-REFERENCE TO RELATED PATENT APPLICATIONS

This application is related to application Ser. No. 09/758,919, filed concurrently herewith on Jan. 11, 2001, having the title ALKALI-FREE ALUMINOBOROSILICATE GLASS, AND USES THEREOF, naming as inventors Dr. Ulrich PEUCHERT and Dr. Peter BRIX.

This application is also related to application Ser. No. 09/758,946, filed concurrently herewith on Jan. 11, 2001, having the title ALKALI-FREE ALUMINOBOROSILI-CATE GLASS, AND USES THEREOF, naming as inventors Dr. Ulrich PEUCHERT and Dr. Peter BRIX.

This application is further related to application Ser. No. 09/758,903, filed concurrently herewith on Jan. 11, 2001, having the title ALKALI-FREE ALUMINOBOROSILI-CATE GLASS, AND USES THEREOF, naming as inventors Dr. Ulrich PEUCHERT and Dr. Peter BRIX.

BACKGROUND OF THE INVENTION

1. Field of the Invention

The invention relates to an alkali-free aluminoborosilicate glass. The invention also relates to uses of this glass.

2. Background of the Invention

High requirements are made of glasses for applications as substrates in flat-panel liquid-crystal (or expressed differently: liquid crystal) display technology, for example in TN (twisted nematic)/STN (supertwisted nematic, or expressed differently: super twisted nematic) displays, active matrix liquid crystal displays (AMLCDs), thin-film transistors (TFTs) or plasma addressed liquid crystals (PALCs). Besides high thermal shock resistance and good resistance to the aggressive chemicals employed in the process for the production of flat-panel screens, the glasses should have high transparency over a broad spectral range (VIS, UV) and, in order to save weight, a low density. Use as substrate material for integrated semiconductor circuits, for example in TFT displays ("chip on glass") in addition requires thermal matching to the thin-film material silicon which is usually deposited on the glass substrate in the form of amorphous silicon (a-Si) at low temperatures of up to 300° C. The amorphous silicon is partially recrystallized by subsequent heat treatment at temperatures of about 600° C. Owing to the a-Si fractions, the resulting, partially crystalline poly-Si layer is characterized by a thermal expansion coefficient of $\alpha_{20/300} \cong 3.7 \times 10^{-6}$/K. Depending on the a-Si/poly-Si ratio, the thermal expansion coefficient $\alpha_{20/300}$ may vary between $2.9 \times 10^{-6}$/K and $4.2 \times 10^{-6}$/K. When substantially crystalline Si layers are generated by high temperature treatments above 700° C. or direct deposition by CVD processes, which is likewise desired in thin-film photovoltaics, a substrate is required which has a significantly reduced thermal expansion of $3.2 \times 10^{-6}$/K or less. In addition, applications in display and photovoltaics technology require the absence of alkali metal ions. Sodium oxide levels of less than 1000 ppm (parts per million) as a result of production can be tolerated in view of the generally "poisoning" action due to diffusion of $Na^+$ into the semiconductor layer.

It should be possible to produce suitable glasses economically on a large industrial scale in adequate quality (no bubbles, knots, inclusions), for example in a float plant or by drawing methods. In particular, the production of thin (<1 mm) streak-free substrates with low surface undulation by drawing methods requires high devitrification stability of the glasses. In order to counter compaction of the substrate during production, in particular in the case of TFT displays, which has a disadvantageous effect on the semiconductor microstructure, the glass needs to have a suitable temperature-dependent viscosity characteristic line: with respect to thermal process and shape stability, it should have a sufficiently high glass transition temperature, i.e. $T_g > 700°$ C., while on the other hand not having excessively high melting and processing ($V_A$) temperature, i.e. a $V_A$ of <1350° C.

The requirements of glass substrates for LCD display technology or thin-film photovoltaics technology are also described in "Glass substrates for AMLCD applications: properties and implications" by J. C. Lapp, SPIE Proceedings, Vol. 3014, invited paper (1997), and in "Photovoltaik—Strom aus der Sonne" by J. Schmid, Verlag C. F. Muller, Heidelberg 1994, respectively.

The abovementioned requirement profile is fulfilled best by alkaline earth metal aluminoborosilicate glasses. However, the known display or solar cell substrate glasses described in the following publications still have disadvantages and do not meet the full list of requirements.

Some documents describe glasses containing relatively little or no BaO, e.g. European Patent Application No. 714 862 B1, International Patent Application No. 98/27019, Japanese Patent Application No. 10-72237 A, European Patent Application No. 510 544 B1, International Patent Application No. 98/11919 and International Patent Application No. 98/11920. Glasses of this type, in particular those having low coefficients of thermal expansion, i.e. low RO content and high network former content, are very susceptible to crystallization. Furthermore, most of the glasses, in particular in European Patent Application No. 714862 B1 and Japanese Patent Application No. 10-72237 A, have very high temperatures at a viscosity of $10^2$ dPas.

However, the preparation of display glasses having high levels of the heavy alkaline earth metal oxides BaO and/or SrO is likewise associated with great difficulties owing to the poor meltability of the glasses. In addition, glasses of this type, as described, for example, in Federal Republic of Germany Patent Application No.37 30 410 A1, U.S. Pat. No. 5,116,789, U.S. Pat. No. 5,116,787, European Patent Application No.341 313 B1, Japanese Patent Application No. 9-169538 A, Japanese Patent Application No. 4-160030 A, European Patent Application No.510 543 B1 and Japanese Patent Application No. 9-100135 A, have an undesirably high density.

Glasses having relatively high levels of light alkaline earth metal oxides, in particular MgO, as described, for example, in Japanese Patent Application No. 9-156953 A, Japanese Patent Application No. 8-295530 A, Japanese Patent Application No. 9-48632 A and Federal Republic of Germany Patent Application No.197 39 912 C1, exhibit good meltability and have a low density. However, they do not meet all requirements made of display and solar cell substrates with regard to chemical resistance, in particular to buffered hydrofluoric acid, to crystallization stability and to heat resistance.

Glasses having low boric acid contents exhibit excessively high melting temperatures or, as a result of this, excessively high viscosities at the melt and processing temperatures required for processes involving these glasses. This applies to the glasses of Japanese Patent Application No. 10-45422 A and Japanese Patent Application No. 9-263421 A.

Moreover, glasses of this type have a high devitrification tendency when combined with low BaO contents.

In contrast, glasses having high boric acid contents, as described, for example, in U.S. Pat. No. 4,824,808, have insufficient heat resistance and chemical resistance, in particular to hydrochloric acid solutions.

Glasses having a relatively low $SiO_2$ content do not have sufficiently high chemical resistance either, in particular when they contain relatively large amounts of $B_2O_3$ and/or MgO and are low in alkaline earth metals. This applies to the glasses of European Patent Application No.672 629 A2. The relatively $SiO_2$-rich variants of the latter document have only low $Al_2O_3$ levels, which is disadvantageous for the crystallization behavior.

Federal Republic of Germany Patent No. 196 17 344 C1 (U.S. Pat. No. 5,908,703) and Federal Republic of Germany Patent No. 196 03 698 C1 (U.S. Pat. No. 5,770,535) by the Applicant disclose alkali-free, tin oxide-containing, low-BaO glasses having a coefficient of thermal expansion $\alpha_{20/300}$ of about $3.7 \times 10^{-6}$ and very good chemical resistance. They are suitable for use in display technology. However, since they must contain ZnO, they are not ideal, in particular for processing in a float plant. In particular at higher ZnO contents (>1.5% by weight), there is a risk of formation of ZnO coatings on the glass surface by evaporation and subsequent condensation in the hot-shaping range.

The glasses described in Japanese Patent Application No. 9-12333 A for hard disks, are comparatively low in $Al_2O_3$ or $B_2O_3$, the latter merely being optional. The glasses have high alkaline earth metal oxide contents and have high thermal expansion, which makes them unsuitable for use in LCD or PV technology.

Federal Republic of Germany Patent No. 196 01 022 A1 describes SnO-containing glasses which are selected from a very wide composition range. The glasses, which, according to the examples, are rich in SnO, tend to exhibit glass defects because of the $ZrO_2$ level which has to be present.

Federal Republic of Germany Patent Application No. 42 13 579 A1 describes glasses for TFT applications having a coefficient of thermal expansion $\alpha_{20/300}$ of $<5.5 \times 10^{-6}$/K, according to the examples of $>4.0 \times 10^{-6}$/K. These glasses which have relatively high $B_2O_3$ levels and relatively low $SiO_2$ contents do not have a high chemical resistance, in particular to diluted hydrochloric acid.

U.S. Pat. No. 5,374,595 describes glasses having coefficients of thermal expansion of between $3.2 \times 10^{-6}$/K and $4.6 \times 10^{-6}$/K. The glasses which, as the examples illustrate, have high BaO content, are relatively heavy and exhibit poor meltability and a thermal expansion which is not ideally matched to substantially crystalline Si.

In the unexamined Japanese publications Japanese Patent Application No. 10-25132 A, Japanese Patent Application No. 10-114538 A, Japanese Patent Application No. 10-130034 A, Japanese Patent Application No. 10-59741 A, Japanese Patent Application No. 10-324526 A, Japanese Patent Application No. 11-43350 A, Japanese Patent Application No. 11-49520 A, Japanese Patent Application No. 10-231139 A and Japanese Patent Application No. 10-139467 A, mention is made of very wide composition ranges for display glasses, which can be varied by means of many optional components and which are admixed with one or more specific refining agents in each case. However, these documents do not indicate how glasses having the complete requirement profile described above can be obtained in a specific manner.

OBJECT OF THE INVENTION

It is an object of the present invention to provide glasses which meet said complex requirement profile with respect to physical and chemical properties which is imposed on glass substrates for liquid-crystal displays, in particular for TFT displays, and for thin-film solar cells, in particular on the basis of $\mu c$-Si, glasses which have high heat resistance, a favorable processing range and sufficient devitrification stability.

SUMMARY OF THE INVENTION

The invention teaches that this object can be accomplished by aluminoborosilicate glasses having a coefficient of thermal expansion $\alpha_{20/300}$ of between $2.8 \times 10^{-6}$/K and $3.8 \times 10^{-6}$/K, which has the following composition (in % by weight, based on oxide): silicon dioxide ($SiO_2$)—from somewhat more than 58% to 65% (>58%–65%); boric oxide ($B_2O_3$)—from somewhat more than 6% to 10.5% (>6%–10.5%); aluminum oxide ($Al_2O_2$)—from somewhat more than 14% to 25% (>14%–25%); magnesium oxide (MgO) from 0% to somewhat less than 3% (0–<3%); calcium oxide (CaO)—from 0% to 9% (0%–9%); strontium oxide (SrO)—from 0.1% to 1.5% (0.1%–1.5%); barium oxide (BaO)—from somewhat more than 5% to 8.5% (>5%–8.5%); with strontium oxide (SrO)—barium oxide (BaO)—equal to or somewhat less than 8.6% ($\leq 8.6\%$); and with magnesium oxide (MgO)+calcium oxide (CaO)+strontium oxide (SrO)+barium oxide (BaO)—from 8% to 18% (8%–18%); and zinc oxide (ZnO)—from 0% to somewhat less than 2% (0%–<2%).

The invention also teaches an alkali-free aluminoborosilicate glass having a coefficient of thermal expansion $\alpha_{20/300}$ of between $2.8 \times 10^{-6}$/K and $3.6 \times 10^{-6}$/K, which has the following composition (in % by weight, based on oxide): silicon dioxide ($SiO_2$)—from somewhat more than 58% to 64.5% (>58%–64.5%); boric oxide ($B_2O_3$)—from somewhat more than 6% to 10.5% (>6%–10.5%); aluminum oxide ($Al_2O_3$)—from 20.5% to 24% (20.5%–24%); magnesium oxide (MgO)—from 0% to somewhat less than 3% (0%–<3%); calcium oxide (CaO)—from 2.5% to somewhat less than 8% (2.5%–< 8%); strontium oxide (SrO)—from 0.1% to 3.5% (0.1%–3.5%); barium oxide (BaO)—from somewhat more than 5% to 7.5% (>5%–7.5%); with strontium oxide (SrO)+barium oxide (BaO) being equal to or less than 8.6% ($\leq 8.6\%$); and with magnesium oxide (MgO)+calcium oxide (CaO)+strontium oxide (SrO)+barium oxide (BaO) in the range of from 8% to 18% (8%–18%); and zinc oxide (ZnO)—from 0% to somewhat less than 2% (0%—<2%).

The glass contains between >58 and 65% by weight of $SiO_2$. At lower contents, the chemical resistance is impaired, while at higher levels, the thermal expansion is too low and the crystallization tendency of the glass increases. Preference is given to a maximum content of 64.5% by weight.

The glass contains relatively high levels of ($Al_2O_3$), i.e. >14–25% by weight of ($Al_2O_3$), preferably at least 18% by weight, particularly preferably >18% by weight. These relatively high $Al_2O_3$ levels are favourable to the crystallization stability of the glass and have a positive effect on its heat resistance without excessively increasing the processing temperature. Particular preference is given to a content of at least 20.5% by weight, most preferably of at least 21.5% by weight, of ($Al_2O_2$). Preference is given to a maximum $Al_2O_3$ content of 24% by weight.

The $B_2O_3$ content is >6–10.5% by weight. The $B_2O_3$ content is restricted to the maximum content specified in order to achieve a high glass transition temperature $T_g$. Higher contents would also impair the chemical resistance to hydrochloric acid solutions. (Preference is given to a maximum $B_2O_2$ content of 11% by weight). The minimum $B_2O_3$ content specified serves to ensure that the glass has good meltability and good crystallization stability. Preference is given to a minimum content of >8% by weight of $B_2O_2$.

The network-forming components ($Al_2O_3$) and $B_2O_3$ are preferably present at mutually dependent minimum levels, ensuring a sufficient content of the network formers $SiO_2$, ($Al_2O_3$) and $B_2O_3$. For example, in the case of a $B_2O_3$ content of >6–10.5% by weight, the minimum $Al_2O_3$ content is preferably >18% by weight, and in the case of an ($Al_2O_3$) content of >14–25% by weight, the minimum $B_2O_3$ content is preferably >8% by weight. Preferably, in particular in order to achieve low thermal expansion coefficients of up to $3.6 \times 10^{-6}$/K, the sum of $SiO_2$, $B_2O_3$ and $Al_2O_3$ is at least 85% by weight.

An essential glass component are the network-modifying alkaline earth metal oxides. With a sum of alkaline earth metal oxides of between 8 and 18% by weight, a coefficient of thermal expansion $\alpha_{20/300}$ of between $2.8 \times 10^{-6}$/K and $3.8 \times 10^{-6}$/K is achieved. BaO and SrO are always present, while MgO and CaO are optional components. Preferably at least three alkaline earth metals are present, particularly preferably all four alkaline earth metals are present. The maximum sum of alkaline earth metal oxides is preferably 15% by weight, particularly preferably 12.5% by weight. These preferred upper limits are in particular advantageous for obtaining glasses having low ($\alpha_{20/300}$>$3.6 \times 10^{-6}$/K) or very low (<$3.2 \times 10^{6}$/K) coefficients of thermal expansion.

The BaO content is between >5 and 8.5% by weight. These relatively high BaO levels were found to ensure a sufficient crystallization stability for the various flat glass production processes such as float methods and the various drawing methods, in particular in the case of low-expansion glass variants having quite high levels of network-forming components and thus a crystallization tendency which is in principle rather high. The maximum BaO content is preferably 8% by weight, particularly preferably 7.5% by weight, which has a positive effect on the desired low density of the glasses.

The glass contains relatively low levels of SrO, i.e., on the one hand, 0.1–1.5% by weight, thus maintaining low melting and hot shaping temperatures and a low density of the glass. The SrO content is preferably limited to a maximum of 1% by weight, in particular in the case of high BaO contents, i.e. from 6% by weight of BaO and more.

On the other hand, the maximum SrO content can be up to 3.5% by weight in the case of high-$Al_2O_3$ (in particular $\geq$20.5% by weight) and relatively CaO-rich (in particular $\pm$2.5% by weight) glasses. The higher SrO content has the positive effect of counteracting the slight increase in crystallization tendency found in relatively CaO-rich glasses having relatively high $Al_2O_3$ contents.

The sum of the two heavy alkaline earth metal oxides is limited to a maximum of 8.6% by weight, preferably <8.5% by weight, in particular <8% by weight.

The glass may furthermore contain up to 9%, preferably <8%, by weight of CaO. Higher levels would lead to an excessive increase in thermal expansion and an increase in crystallization tendency. It is preferred that the glass contains CaO, specifically preferably in an amount of at least 1% by weight, particularly preferably at least 2.5% by weight. This has a positive effect on the desired low density of the glasses.

The glass may also contain up to <3% by weight of MgO. Relatively high levels thereof are beneficial for a low density and a low processing temperature, whereas relatively low levels are favorable with regard to the chemical resistance of the glass, in particular to buffered hydrofluoric acid, and its devitrification stability.

The glasses may furthermore contain up to <2% by weight of ZnO. ZnO has an effect on the viscosity characteristic line which is similar to that of boric acid, has a structure-loosening function and has less effect on the thermal expansion than the alkaline earth metal oxides. The maximum ZnO level is preferably limited to 1.5% by weight, in particular when the glass is processed by the float method. Higher levels would increase the risk of unwanted ZnO coatings on the glass surface which may form by evaporation and subsequent condensation in the hot-shaping range. The presence of at least 0.1% by weight is preferred, as the addition of ZnO, even in small amounts, leads to an increase in devitrification stability.

In addition to the low-SrO glass of the main claim, a glass having the desired requirement profile and a coefficient of thermal expansion $\alpha_{20/300}$ of between $2.8 \times 10^{-6}$/K and $3.6 \times 10^{-6}$/K is also described by the following composition (in % by weight, based on oxide): $SiO_2$>58–64.5, $B_2O_3$>6–10.5, $Al_2O_3$>20.5–24, MgO 0–<3, CaO 2.5–<8, SrO 0.1–3.5 and BaO>5–7.5, with SrO+BaO$\leq$8.6 and with MgO+CaO+SrO+BaO 8–18; ZnO 0–<2.

The glass is alkali-free. The term "alkali-free" as used herein means that it is essentially free from alkali metal oxides, although it can contain impurities of less than 1000 ppm (parts per million).

The glass may contain up to 2% by weight of $ZrO_2$+$TiO_2$, where both the $TiO_2$ content and the $ZrO_2$ content can each be up to 2% by weight. $ZrO_2$ advantageously increases the heat resistance of the glass. Owing to its low solubility, $ZrO_2$ does, however, increase the risk of $ZrO_2$-containing melt relicts, so-called zirconium nests, in the glass. $ZrO_2$ is therefore preferably omitted. Low $ZrO_2$ contents originating from corrosion of zirconium-containing trough material are unproblematic. $TiO_2$ advantageously reduces the solarization tendency, i.e. the reduction in transmission in the visible wavelength region because of UV-VIS radiation. At contents of greater than 2% by weight, colour casts can occur due to complex formation with $Fe^{3+}$ ions which are present in the glass at low levels as a result of impurities of the raw materials employed.

The glass may contain conventional refining agents in the usual amounts: it may thus contain up to 1.5% by weight of $As_2O_3$, $Sb_2O_3$, $SnO_2$, $CeO_2$, $Cl^-$ (for example in the form of $BaCl_2$), F (for example in the form of $CaF_2$) and/or $SO_4^{2-}$ (for example in the form of $BaSO_4$). The sum of the refining agents should, however, not exceed 1.5% by weight. If the refining agents $As_2O_3$ and $Sb_2O_3$ are omitted, the glass can be processed not only using a variety of drawing methods, but also by the float method.

For example with regard to easy batch preparation, it is advantageous to be able to omit both $ZrO_2$ and $SnO_2$ and still obtain glasses having the property profile mentioned above, in particular having high heat and chemical resistance and low crystallization tendency.

The above-discussed embodiments of the present invention will be described further hereinbelow. When the word "invention" is used in this specification, the word "invention" includes "inventions", that is the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

DESCRIPTION OF THE PREFERRED EMBODIMENT

The invention is further described with reference to examples, i.e. working examples, as follows.

Working Examples

Glasses were produced in Pt/Ir crucibles at 1620° C. from conventional raw materials which were essentially alkali-free apart from unavoidable impurities. The melt was refined at this temperature for one and a half hours, then transferred into inductively heated platinum crucibles and stirred at 1550° C. for 30 minutes for homogenization.

The Table shows sixteen examples of glasses according to the invention with their compositions (in % by weight, based on oxide) and their most important properties. The refining agent $SnO_2$ at a level of 0.3% by weight is not listed. The following properties are given:

the coefficient of thermal expansion $\alpha_{20/300}$ $[10^{-6}/K]$ the density $\rho$ $[g/cm^3]$ the dilatometric glass transition temperature $T_g$ [°C.] in accordance with DIN 52324 the temperature at a viscosity of $10^4$ dPas (referred to as T 4 [°C.])

the temperature at a viscosity of $10^2$ dPas (referred to as T 2 [°C.]), calculated from the Vogel-Fulcher-Tammann equation the refractive index $n_d$ the "HCl" acid resistance as weight loss (material removal value) from glass plates measuring 50 mm×50 mm×2 mm polished on all sides after treatment with 5% strength hydrochloric acid for 24 hours at 95° C. $[mg/cm^2]$ the "BHF" resistance to buffered hydrofluoric acid as weight loss (material removal value) from glass plates measuring 50 mm×50 mm×2 mm and polished on all sides after treatment with 10% strength $NH_4F \cdot HF$ solution for 20 minutes at 23° C. $[mg/cm^2]$.

Examples: Compositions (in % by weight, based on oxide) and essential properties of glasses according to the invention.

TABLE

Examples: Compositions (in % by weight, based on oxide) and essential properties of glasses according to the invention

| | 1 | 2 | 3 | 4 | 5 | 6 |
|---|---|---|---|---|---|---|
| $SiO_2$ | 59.6 | 59.7 | 59.6 | 58.5 | 61.5 | 60.0 |
| $B_2O_3$ | 7.5 | 7.4 | 7.5 | 8.4 | 8.0 | 6.8 |
| $Al_2O_3$ | 20.5 | 20.5 | 20.5 | 21.2 | 18.5 | 21.5 |
| MgO | 2.5 | 2.5 | 2.5 | 2.5 | 2.5 | 1.0 |
| CaO | 2.5 | 2.5 | 4.0 | 3.5 | 3.6 | 5.0 |
| SrO | 1.1 | 0.1 | 0.1 | 0.1 | 0.1 | 0.2 |
| BaO | 6.0 | 7.0 | 5.5 | 5.5 | 5.5 | 5.2 |
| ZnO | — | — | — | — | — | — |
| $\alpha_{20/300}$ $[10^{-6}/K]$ | 3.05 | 3.08 | 3.20 | 3.13 | 3.14 | 3.18 |
| $\rho$ $[g/cm^3]$ | 2.51 | 2.51 | 2.50 | 2.49 | 2.48 | 2.50 |
| $T_g$ [° C.] | 744 | 743 | 741 | 740 | 731 | 753 |
| T4 [° C.] | 1323 | 1318 | 1308 | 1301 | 1311 | 1323 |
| T2 [° C.] | 1690 | 1678 | 1667 | 1657 | 1678 | 1685 |
| $n_d$ | 1.518 | 1.518 | 1.520 | 1.520 | 1.516 | 1.521 |
| HCl $[mg/cm^2]$ | n.m. | 0.68 | 0.69 | n.m. | 0.65 | n.m. |
| BHF $[mg/cm^2]$ | 0.59 | 0.57 | 0.56 | 0.57 | 0.52 | 0.53 |

| | 7 | 8 | 9 | 10 | 11 | 12 |
|---|---|---|---|---|---|---|
| $SiO_2$ | 58.2 | 58.1 | 60.5 | 61.5 | 62.0 | 61.0 |
| $B_2O_3$ | 7.6 | 7.6 | 9.5 | 9.6 | 9.5 | 6.2 |
| $Al_2O_3$ | 21.4 | 21.5 | 18.2 | 17.1 | 16.5 | 18.5 |
| MgO | 2.8 | 2.8 | 1.9 | 1.9 | 2.7 | 1.0 |
| CaO | 2.5 | 2.5 | 2.6 | 2.6 | 1.3 | 6.0 |
| SrO | 2.0 | 1.0 | 1.0 | 0.5 | 0.7 | 1.0 |
| BaO | 5.2 | 5.2 | 6.0 | 6.5 | 7.0 | 5.5 |
| ZnO | — | 1.0 | — | — | — | 0.5 |
| $\alpha_{20/300}$ $[10^{-6}/K]$ | 3.18 | 3.09 | 3.04 | 3.04 | 3.02 | 3.46 |
| $\rho$ $[g/cm^3]$ | 2.51 | 5.52 | 2.46 | 2.44 | 2.48 | 2.53 |
| $T_g$ [° C.] | 747 | 742 | 727 | 723 | 715 | 740 |
| T4 [° C.] | 1303 | 1305 | 1320 | 1325 | 1309 | 1315 |
| T2 [° C.] | 1655 | 1660 | 1671 | 1678 | 1681 | n.m. |
| $n_d$ | 1.522 | 1.522 | 1.514 | 1.512 | 1.510 | n.m. |
| HCl $[mg/cm^2]$ | n.m. | n.m. | n.m. | n.m. | n.m. | n.m. |
| BHF $[mg/cm^2]$ | 0.65 | 0.64 | 0.53 | 0.50 | 0.52 | n.m. |

| | 13 | 14 | 15 | 16 |
|---|---|---|---|---|
| $SiO_2$ | 59.9 | 58.9 | 59.9 | 59.7 |
| $B_2O_3$ | 8.5 | 8.5 | 6.5 | 8.0 |
| $Al_2O_3$ | 15.5 | 16.5 | 18.5 | 20.5 |
| MgO | 2.0 | 0.6 | 2.8 | 1.6 |
| CaO | 7.2 | 8.2 | 6.0 | 2.5 |
| SrO | 1.0 | 0.5 | 0.5 | 2.0 |
| BaO | 5.1 | 5.5 | 5.5 | 5.1 |
| ZnO | 0.5 | 1.0 | — | — |
| $\alpha_{20/300}$ $[10^{-6}/K]$ | 3.74 | 3.75 | 3.57 | 3.03 |
| $\rho$ $[g/cm^3]$ | 2.52 | 2.53 | 2.53 | 2.495 |
| $T_g$ [° C.] | 706 | 708 | 737 | 740 |
| T4 [° C.] | 1264 | 1266 | 1291 | 1324 |
| T2 [° C.] | 1623 | 1624 | 1646 | 1708 |
| $n_d$ | 1.524 | 1.526 | 1.526 | 1.517 |
| HCl $[mg/cm^2]$ | 0.38 | 0.37 | 0.27 | 0.99 |
| BHF $[mg/cm^2]$ | 0.53 | 0.51 | 0.58 | 0.59 | n.m. = not measured

As the working examples illustrate, the glasses according to the invention have the following advantageous properties:

a thermal expansion $\alpha_{20/300}$ of between $2.8 \times 10^{-6}/K$ and $3.8 \times 10^{-6}/K$, in preferred embodiments $<3.6 \times 10^{-6}/K$, in particularly preferred embodiments $<3.2 \times 10^{-6}/K$, thus matched to the expansion behavior of both amorphous silicon and increasingly polycrystalline silicon.

$T_g > 700°$ C., a very high glass transition temperature, i.e. a high heat resistance. This is essential for the lowest possible compaction as a result of production and for use of the glasses as substrates for coatings with amorphous Si layers and their subsequent annealing.

$\rho < 2.600$ $g/cm^3$, a low density a temperature at a viscosity of $10^4$ dPas (processing temperature $V_A$) of at most 1350° C., and a temperature at a viscosity of $10^2$ dPas of at most 1720° C., which means a suitable viscosity characteristic line with regard to hot-shaping and meltability.

$n_d \leq 1.526$, a low refractive index. This property is the physical prerequisite for a high transmission of the glasses.

a high chemical resistance, as is evident inter alia from good resistance to buffered hydrofluoric acid solution, which makes them sufficiently inert to the chemicals used in the production of flat-panel screens.

The glass have high thermal shock resistance and good devitrification stability. The glasses can be produced as flat glasses by the various drawing methods, for example microsheet down-draw, up-draw or overflow fusion methods, and, in a preferred embodiment, if they are free from $As_2O_3$ and $Sb_2O_3$, also by the float process.

With these properties, the glasses are thus highly suitable for use as substrate glass in display technology, in particular for TFT displays, and in thin-film photovoltaics, in particular on the basis of amorphous and $\mu c$-Si.

Alkali-free aluminoborosilicate glass in accordance with the present invention may, for example, have any value of coefficient of thermal expansion $\alpha_{20/300}$ in the range of between about $2.8 \times 10^{-6}$/K and about $3.8 \times 10^{-6}$/K, for example, 2.9 and 3.7. Thus, the value of the coefficient of thermal expansion $\alpha_{20/300}$ is not limited to the first and final values of the range, but can comprise any value of coefficient of thermal expansion $\alpha_{20/300}$ between them.

The alkali-free aluminoborosilicate glass in accordance with the present invention may, for example, have any value (in % by weight, based on oxide) of silica, silicon dioxide ($SiO_2$) in the range of from about 58 to about 65, for example, 59 and 64. Thus, the value for $SiO_2$, in % by weight, based on oxide, is not limited to the first and final values of the range, but can comprise any value of $SiO_2$ between them.

The alkali-free aluminoborosilicate glass in accordance with the present invention may, for example, have any value (in % by weight, based on oxide) of boric oxide ($B_2O_3$) in the range of from about 6 to about 10.5, for example, 6.5 and 10. Thus, the value for $B_2O_3$, in % by weight, based on oxide, is not limited to the first and final values of the range, but can comprise any value of $B_2O_3$ between them.

Similarly, the alkali-free aluminoborosilicate glass in accordance with the present invention may, for example, have any value (in % by weight, based on oxide) of alumina, aluminum oxide ($Al_2O_3$) in the range of from about 14 to about 25, for example, 15 and 24. Thus, the value for $Al_2O_3$, in % by weight, based on oxide, is not limited to the first and final values of the range, but can comprise any value of $Al_2O_3$ between them.

Thus, components of the composition of the alkali-free aluminoborosilicate glass in accordance with the examples are likewise not limited to the first and final values of the indicated range, but can comprise any value between them.

The expression "coefficient of thermal expansion $\alpha_{20/300}$" may indicate the fractional change in the length or volume of a body per degree of temperature change for the range of from 20 to 300 degrees Celsius.

The expression $\mu c$-Si is to mean in at least one embodiment of the invention: micro-crystalline silicon.

The expression thermal expansion coefficient or coefficient of thermal expansion ($\alpha_{20/300}$) in at least one embodiment of the invention is to mean: a nominal thermal coefficient ($\alpha$) as possibly applicable in the temperature range of from 20 to 300 in the Celsius scale, as possibly applicable in the context of the indicated data.

The expression glass transition temperature ($T_g$) in at least one embodiment of the invention is to mean: (1) the temperature below which a substance becomes superconducting; or (2) the temperature at which one polymorph changes into the next thermodynamically stable state; as the shown technical data suggest.

The density ($\rho$) is to mean in at least one embodiment of the invention: (1) the mass of a substance per unit of volume, expressed as kilograms per cubic meter, or expressed in smaller units, grams per cubic centimeter; or (2) the degree of opacity of a translucent material; as the technical data suggest.

The term DIN refers to the German Standard Organization "Deutsches Institute füur Normung e.V., in Berlin, Germany, from which the numbered standards may be obtained.

The Vogel-Fulcher-Tammann equation is possibly related to the Fulcher equation meaning empirical in derivation; it relates glass viscosity to temperature: $\log \eta = -A + B/T - T_0$ where the temperature T is in degrees Celsius, A, B, and $T_0$ are material-specific constants.

One feature of the invention resides broadly in an alkali-free aluminoborosilicate glass having a coefficient of thermal expansion $\alpha_{20/300}$ of between $2.8 \times 10^{-5}$/K and $3.8 \times 10^{-6}$/K, which has the following composition (in % by weight, based on oxide): $SiO_2$>58–65; $B_2O_3$>6–10.5; $Al_2O_3$>14–25; MgO 0–<3; CaO 0–9; SrO 0.1–1.5; BaO >5–8.5; with SrO+BaO $\leq$8.6; with MgO+CaO+SrO+BaO 8–18; or ZnO 0–<2.

Another feature of the invention resides broadly in an aluminoborosilicate glass, characterized in that it comprises at least 18% by weight, preferably more than 18% by weight, of $Al_2O_3$.

Yet another feature of the invention resides broadly in an aluminoborosilicate glass, characterized by the following composition (in % by weight, based on oxide): $SiO_2$>58–64.5; $B_2O_3$>6–10.5; $Al_2O_3$>18–24; MgO 0–<3; CaO 1–<8; SrO 0.1–1.5; BaO >5–8; with SrO+BaO <8.5; with MgO+CaO+SrO+BaO 8–18; or ZnO 0–<2.

Still another feature of the invention resides broadly in an aluminoborosilicate glass, characterized in that it comprises at least 20.5% by weight of $Al_2O_3$.

A further feature of the invention resides broadly in an alkali-free aluminoborosilicate glass having a coefficient of thermal expansion $\alpha_{20/300}$ of between $2.8 \times 10^{-6}$/K and $3.6 \times 10^{-6}$/K, which has the following composition (in % by weight, based on oxide): $SiO_2$>58–64.5; $B_2O_3$>6–10.57 $Al_2O_3$ 20.5–24; MgO 0–<3; CaO 2.5–<8; SrO 0.1–3.5; BaO>5–7.5; with SrO+BaO$\leq$8.6; with MgO+CaO+SrO+BaO 8–18; ZnO 0–<2.

Another feature of the invention resides broadly in an aluminoborosilicate glass, characterized in that it comprises at least 21.5% by weight of $Al_2O_3$.

Still another feature of the invention resides broadly in an aluminoborosilicate glass, characterized in that it comprises more than 8% by weight of $B_2O_3$.

Yet another feature of the invention resides broadly in an aluminoborosilicate glass, characterized in that it comprises at least 0.1% by weight of ZnO.

A further feature of the invention resides broadly in an aluminoborosilicate glass, characterized in that it additionally comprises: $ZrO_2$ 0–2; $TiO_2$ 0–2; with $ZrO_2$+$TiO_2$ 0–2; $As_2O_3$ 0–1.5; $Sb_2O_3$ 0–1.5; $SnO_2$ 0–1.5; $CeO_2$ 0–1.5; $Cl^-$ 0–1.5; $F^-$ 0–1.5; $SO_4^{2-}$ 0–1.5; with $As_2O_3$+$Sb_2O_3$+$SnO_2$+$CeO_2$+$Cl^-$+$F^-$+$SO_4^{2-}$$\leq$1.5.

Another feature of the invention resides broadly in an aluminoborosilicate glass, characterized in that it is free of arsenic oxide and antimony oxide, apart from unavoidable impurities, and that it can be produced in a float plant.

Still another feature of the invention resides broadly in an aluminoborosilicate glass, which has a coefficient of thermal expansion $\alpha_{20/300}$ of $2.8 \times 10^{-6}$/K-$3.6 \times 10^{-6}$/K, a glass transition temperature $T_g$ of >700° C. and a density $\rho$ of <2.600 g/cm$^3$.

Yet another feature of the invention resides broadly in a use of the aluminoborosilicate glass as substrate glass in display technology.

Still another feature of the invention resides broadly in a use of the aluminoborosilicate glass as substrate glass in thin-film photovoltaics.

The features disclosed in the various publications, disclosed or incorporated by reference herein, may be used in the embodiments of the present invention, as well as, equivalents thereof.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Federal Republic of Germany Patent Application No. 100 00 838.0–45, filed on Jan. 12, 2000, having inventors Dr. Ulrich PEUCHERT and Dr. Peter BRIX, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein, are hereby incorporated by reference as if set forth in their entirety herein.

The corresponding foreign and international patent publication applications, namely, Federal Republic of Germany Patent Application No. 100 00 836.4-45, filed on Jan. 12, 2000, having inventors Dr. Ulrich PEUCHERT and Dr. Peter BRIX, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein, are hereby incorporated by reference as if set forth in their entirety herein.

The corresponding foreign and international patent publication applications, namely, Federal Republic of Germany Patent Application No. 100 00 839.9-45, filed on Jan. 12, 2000, having inventors Dr. Ulrich PEUCHERT and Dr. Peter BRIX, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein, are hereby incorporated by reference as if set forth in their entirety herein.

The corresponding foreign and international patent publication applications, namely, Federal Republic of Germany Patent Application No. 100 00 837.2-45, filed on Jan. 12, 2000, having inventors Dr. Ulrich PEUCHERT and Dr. Peter BRIX, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein, are hereby incorporated by reference as if set forth in their entirety herein.

The U.S. Pat. No. 5,374,595 issued on Dec. 20, 1994 to William H. Dumbaugh, Jr., et al. and entitled "High liquidus viscosity glasses for flat panel displays", and its other equivalents or corresponding applications, if any, and the references cited in any of the documents cited therein, are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

Features of aluminoborosilicate glass, and the use thereof, which may possibly be incorporated in embodiments of the present invention may be found in U.S. Pat. No. 6,096,670 issued on Aug. 1, 2000 to Lautenschläger, et al. and entitled "Alkali metal-free aluminoborosilicate glass and its use"; U.S. Pat. No. 6,074,969 issued on Jun. 13, 2000 to Naumann, et al. and entitled "Earth-alkaline aluminoborosilicate glass for lamp bulbs"; U.S. Pat. No. 6,065,309 issued on May 23, 2000 to Cooper, et al. and entitled "Float processing of high-temperature complex silicate glasses and float baths used for same"; U.S. Pat. No. 6,013,310 issued on Jan. 11, 2000 to Yaoi, et al. and entitled "Method for producing a thin film semiconductor device"; U.S. Pat. No. 6,000,241 issued on Dec. 14, 1999 to Ranade, et al. and entitled "Process for making barium containing silicate glass powders"; U.S. Pat. No. 5,985,700 issued on Nov. 16, 1999 to Moore and entitled "TFT fabrication on leached glass surface"; U.S. Pat. No. 5,952,253 issued on Sep. 14, 1999 to Dejneka, et al. and entitled "Transparent apatite glass ceramics"; U.S. Pat. No. 5,932,326 issued on Aug. 3, 1999 to Kashima, et al. and entitled "Ceramic wiring boards and method for their manufacture"; U.S. Pat. No. 5,908,703 issued on Jun. 1, 1999 to Gaschler, et al. and entitled "Alkali-free aluminoborosilicate glass and its use" also referred to above; U.S. Pat. No. 5,871,654 issued on Feb. 16, 1999 to Mannami, et al. and entitled "Method for producing a glass substrate for a magnetic disc"; U.S. Pat. No. 5,824,127 issued on Oct. 20, 1998 to Bange, et al. and entitled "Arsenic-free glasses"; U.S. Pat. No. 5,785,726 issued on Jul. 28, 1998 to Dorfeld, et al. and entitled "Method of reducing bubbles at the vessel/glass interface in a glass manufacturing system"; U.S. Pat. No. 5,770,535 issued on Jun. 23, 1998 to Brix, et al. and entitled "Alkali-free aluminoborosilicate glass and its use" also referred to above; U.S. Pat. No. 5,707,746 issued on Jan. 13, 1998 to Yaoi, et al. and entitled "Thin film transistor device with advanced characteristics by improved matching between a glass substrate and a silicon nitride layer"; U.S. Pat. No. 5,374,595 issued on Dec. 20, 1994 to Dumbaugh, Jr., et al and entitled "High liquidus viscosity glasses for flat panel displays", corresponding European Patent Application 0 607 865 A1 with date of publication of application: Jul. 27, 1994; U.S. Pat. No. 5,326,730 issued on Jul. 5, 1994 to Dumbaugh, Jr., et al. and entitled "Barium Aluminosilicate glasses"; U.S. Pat. No. 5,017,434 issued on May 21, 1991 to Enloe, et al. and entitled "Electronic package comprising aluminum nitride and aluminum nitride-borosilicate glass composite"; U.S. Pat. No. 4,940,674 issued on Jul. 10, 1990 to Beall, et al. and entitled "High strength haze-free transparent glass-ceramics"; U.S. Pat. No. 4,399,015 issued on Aug. 16, 1983 to Endo, et al. and entitled "Method for fabricating an indium tin oxide film for a transparent electrode"; U.S. Pat. No. 4,248,615 issued on Feb. 3, 1981 to Seng, et al. and entitled "Pollution abating, energy conserving glass manufacturing process"; U.S. Pat. No. 3,998,667 issued on Dec. 21, 1976 to Rapp and entitled "Barium aluminoborosilicate glass-ceramics for semiconductor doping"; U.S. Pat. No. 3,962,000 issued on Jun. 8, 1976 to Rapp and entitled "Barium aluminoborosilicate glass-ceramics for semiconductor doping"; U.S. Pat. No. 3,961,969 issued on Jun. 8, 1976 to Rapp and entitled "Glass-ceramics for semiconductor doping"; and U.S. Pat. No. 3,907,618 issued on Sep. 23, 1975 to Rapp and entitled "Process for doping semiconductor employing glass-ceramic dopant".

Examples of twisted nematic and/or super twisted nematic displays in which may possibly be incorporated embodiments of the present invention may be found in U.S. Pat. No. 6,023,317 issued on Feb. 8, 2000 to Xu, et al. and entitled "Normally white twisted nematic LCD with positive and negative retarders"; U.S. Pat. No. 5,859,681 issued on Jan. 12, 1999 to VanderPloeg, et al. and entitled "Normally white twisted nematic LCD with positive uniaxial and negative biaxial retarders having $N_x > N_y > N_z$"; U.S. Pat. No. 5,818,615 issued on Oct. 6, 1998 to Abileah, et al. and entitled "Liquid crystal display with patterned retardation films"; U.S. Pat. No. 5,694,187 issued on Dec. 2, 1997 to Abileah, et al. and entitled "LCD including negative biaxial retarder on each side of the liquid crystal layer"; U.S. Pat. No. 5,657,140 issued on Aug. 12, 1997 to Xu, et al. and entitled "Normally white twisted nematic LCD with positive and negative retarders"; U.S. Pat. No. 5,576,855 issued on Nov. 19, 1996 to Swirbel, et al. and entitled "Liquid crystal display having embossed appearing characters"; and U.S. Pat. No. 3,975,286 issued on Aug. 17, 1976 to Oh and entitled "Low voltage actuated field effect liquid crystals compositions and method of synthesis".

Examples of active matrix liquid crystal displays (AMLCDs) in which may possibly be incorporated embodiments of the present invention may be found in U.S. Pat. No. 6,146,930 issued on Nov. 14, 2000 to Kobayashi, et al. and entitled "Method of fabricating and active-matrix liquid crystal display"; U.S. Pat. No. 6,140,990 issued on Oct. 31, 2000 to Schlig and entitled "Active matrix liquid crystal display incorporating pixel inversion with reduced drive pulse amplitudes"; U.S. Pat. No. 6,137,558 issued on Oct. 24, 2000 to Koma, et al. and entitled "Active-matrix liquid crystal display"; U.S. Pat. No. 6,091,473 issued on Jul. 18, 2000 to Hebiguchi and entitled "Active matrix liquid crystal display"; U.S. Pat. No. 6,075,580 issued on Jun. 13, 2000 to Kouchi and entitled "Active matrix type liquid crystal display apparatus with conductive light shield element"; U.S. Pat. No. 6,052,168 issued on Apr. 18, 2000 to Nishida, et al. and entitled "Active matrix liquid-crystal display with verticle alignment, positive anisotropy and opposing electrodes below pixel electrode"; U.S. Pat. No. 6,040,813 issued on Mar. 21, 2000 to Takubo and entitled "Active matrix liquid crystal display device and a method for driving the same"; U.S. Pat. No. 6,028,578 issued on Feb. 22, 2000 to Ota, et al. and entitled "Active matrix type liquid crystal display system and driving method therefor"; U.S. Pat. No. 5,990,998 issued on Nov. 23, 1999 to Park, et al. and entitled "Active matrix liquid crystal display and related method"; U.S. Pat. No. 5,880,794 issued on Mar. 9, 1999 to Hwang and entitled "Active matrix liquid crystal display and method with two anodizations"; U.S. Pat. No. 5,861,326 issued on Jan. 19, 1999 to Yamazaki, et al. and entitled "Method for manufacturing semiconductor integrated circuit"; U.S. Pat. No. 5,808,410 issued on Sep. 15, 1998 to Pinker, et al. and entitled "Flat panel light source for liquid crystal displays"; U. S. Pat. No. 5,767,930 issued to Kobayashi, et al. and entitled "Active-matrix liquid-crystal display and fabrication method thereof"; U.S. Pat. No. 5,739,180 issued on Apr. 14, 1998 to Taylor-Smith and entitled "Flat-panel displays and methods and substrates therefor"; U.S. Pat. No. 5,650,865 issued on Jul. 22, 1997 to Smith and entitled "Holographic backlight for flat panel displays"; U.S. Pat. No. Re 35,416 reissued on Dec. 31, 1996 to Suzuki, et al. and entitled "Active matrix liquid crystal display device and method for production thereof"; U.S. Pat. No. 5,546,204 issued on Aug. 13, 1996 to Ellis and entitled "TFT matrix liquid crystal device having data source lines and drain means of etched and doped single crystal silicon"; U.S. Pat. No. 5,493,986 issued on Feb. 27, 1996 to Augusto and entitled "Method of providing VLSI-quality crystalline semiconductor substrates; U.S. Pat. No. 5,465,052 issued on Nov. 7, 1995 to Henley and entitled "Method of testing liquid crystal display substrates"; U.S. Pat. No. 5,184,236 issued on Feb. 2, 1993 to Miyashita, et al. and entitled "Twisted nematic liquid crystal display device with retardation plates having phase axis direction with 15° of alignment direction"; U.S. Pat. No. 5,182,661 issued on Jan. 26, 1993 to Ikeda, et al. and entitled "Thin film field effect transistor array for use in active matrix liquid crystal display"; and U.S. Pat. No. 5,084,905 issued on Jan. 28, 1992 to Sasaki, et al. and entitled "Thin film transistor panel and manufacturing method thereof".

Examples of thin-film transistors (TFT) displays in which may possibly be incorporated embodiments of the present invention may be found in U.S. Pat. No. 6,087,678 issued on Jul. 11, 2000 to Kim and entitled "Thin-film transistor display devices having composite electrodes"; U.S. Pat. No. 6,005,646 issued on Dec. 21, 1999 to Nakamura, et al. and entitled "Voltage application driving method"; U.S. Pat. No. 5,920,362 issued on Jul. 6, 1999 to Lee and entitled "Method of forming thin-film transistor liquid crystal display having a silicon active layer contacting a sidewall of a data line and a storage capacitor electrode"; U.S. Pat. No. 5,920,083 issued on Jul. 6, 1999 to Bae and entitled "Thin-film transistor display devices having coplanar gate and drain lines"; U.S. Pat. No. 5,917,564 issued on Jun. 29, 1999 and entitled "Methods of forming active matrix display devices with reduced susceptibility to image-sticking and devices formed thereby"; U.S. Pat. No. 5,619,357 issued on Apr. 8, 1997 to Angelopoulos, et al. and entitled "Flat panel display containing black matrix polymer"; U.S. Pat. No. 5,317,433 issued on May 31, 1994 to Miyawaki, et al. and entitled "Image display device with a transistor on one side of insulating layer and liquid crystal on the other side"; U.S. Pat. No. 5,250,937 issued on Oct. 5, 1993 to Kikuo, et al. and entitled "Half tone liquid crystal display circuit with an A.C. voltage divider for drivers"; U.S. Pat. No. 5,233,448 issued on Aug. 3, 1993 to Wu and entitled "Method of manufacturing a liquid crystal display panel including photoconductive electrostatic protection"; U.S. Pat. No. 4,723,838 issued on Feb. 9, 1988 to Aoki, et al. and entitled "Liquid crystal display device"; and U.S. Pat. No. 4,404,578 issued on Sep. 13, 1983 to Takafuji, et al. and entitled "Structure of thin film transistors".

Examples of plasma addressed liquid crystals (PALCs) displays in which may possibly be incorporated embodiments of the present invention may be found in U.S. Pat. No. 6,094,183 issued on Jul. 25, 2000 to Tanamachi, et al. and entitled "Plasma addressed liquid crystal display device"; U.S. Pat. No. 6,081,245 issued on Jun. 27, 2000 to Abe and entitled "Plasma-addressed liquid-crystal display device"; U.S. Pat. No. 5,997,379 issued on Dec. 7, 1999 to Kimura and entitled "Method of manufacturing plasma addressed liquid crystal display"; U.S. Pat. No. 5,984,747 issued on Nov. 16, 1999 to Bhagavatula, et al. and entitled "Glass structures for information displays"; U.S. Pat. No. 5,886,467 issued on Mar. 23, 1999 to Kimura and entitled "Plasma addressed liquid crystal display device"; U.S. Pat. No.

5,844,639 issued on Dec. 1, 1998 to Togawa and entitled "Plasma addressed liquid crystal display device"; U.S. Pat. No. 5,810,634 issued on Sep. 22, 1998 to Miyazaki, et al. and entitled "Method of manufacturing a plasma addressed liquid crystal display device"; U.S. Pat. No. 5,757,342 issued on May 26, 1998 to Hayashi and entitled "Plasma addressed liquid crystal display device"; U.S. Pat. No. 5,725,406 issued on Mar. 10, 1998 to Togawa and entitled "Plasma addressed display device"; U.S. Pat. No. 5,698,944 issued on Dec. 16, 1997 to Togawa and entitled "Plasma addressed liquid crystal display device"; U.S. Pat. No. 5,526,151 issued on Jun. 11, 1996 to Miyazaki, et al. and entitled "Method of manufacturing a plasma addressed liquid crystal display device having planarized barrier ribs"; U.S. Pat. No. 5,499,122 issued on Mar. 12, 1996 to Yano and entitled "Plasma-addressed liquid crystal display device having a transparent dielectric sheet with a porous layer containing an impregnated liquid crystal"; U.S. Pat. No. 5,383,040 issued on Jan. 17, 1995 to Kim and entitled "Plasma addressed liquid crystal display with center substrate divided into separate sections"; U.S. Pat. No. 5,377,029 issued on Dec. 27, 1994 to Lee, et al. and entitled "Plasma addressed liquid crystal display"; and U.S. Pat. No. 5,221,979 issued on Jun. 22, 1993 to Kim and entitled "Plasma addressed liquid crystal display and manufacturing method".

The details in the patents, patent applications and publications may be considered to be incorporable, at Applicants' option, into the claims during prosecution as further limitations in the claims to patentably distinguish any amended claims from any applied prior art.

Examples of thin-film photovoltaic apparatus and methods of making them in which may possibly be incorporated embodiments of the present invention may be found in U.S. Pat. No. 6,137,048 issued on Oct. 24, 2000 to Wu, et al. and entitled "Process for fabricating polycrystalline semiconductor thin-film solar cells, and cells produced thereby"; U.S. Pat. No. 5,922,142 issued on Jul. 13, 1999 to Wu, et al. and entitled "Photovoltaic devices comprising cadmium stannate transparent conducting films and method for making"; U.S. Pat. No. 5,503,898 issued on Apr. 2, 1996 to Lauf and entitled "Method for producing textured substrates for thin-film photovoltaic cells"; U.S. Pat. No. 5,378,639 issued on Jan. 3, 1995 to Sasaki, et al. and entitled "Method for manufacturing a thin-film photovoltaic conversion device"; U.S. Pat. No. 5,306,646 issued on Apr. 26, 1994 to Lauf and entitled "Method for producing textured substrates for thin-film photovoltaic cells"; U.S. Pat. No. 5,057,163 issued on Oct. 15, 1991 to Barnett, et al. and entitled "Deposited-silicon film solar cell"; U.S. Pat. No. 4,772,564 issued on Sep. 20, 1988 to Barnett, et al. and entitled "Fault tolerant thin-film photovoltaic cell fabrication Process"; U.S. Pat. No. 4,677,250 issued on Jun. 30, 1987 to Barnett, et al. and entitled "Fault tolerant thin-film photovoltaic cell"; U.S. Pat. No. 4,647,711 issued on Mar. 3, 1987 to Basol, et al. and entitled "Stable front contact current collectors for photovoltaic devices and method of making same"; U.S. Pat. No. 4,604,791 issued on Aug. 12, 1986 to Todorof and entitled "Method for producing multi-layer, thin-film, flexible silicon alloy photovoltaic cells"; and U.S. Pat. No. 4,595,790 issued on Jun. 17, 1986 to Basol and entitled "Method of making current collector grid and materials therefor".

Features of processing technology which may possibly be incorporated in embodiments of the present invention may be found in U.S. Pat. No. 5,766,296 issued on Jun. 16, 1998 to Moreau and entitled "Furnace for melting glass and method for using glass produced therein"; U.S. Pat. No. 5,764,415 issued on Jun. 9, 1998 to Nelson, et al. and entitled "Coatings on glass"; U.S. Pat. No. 5,057,140 issued on Oct. 15, 1991 to Nixon and entitled "Apparatus for melting glass batch material"; U.S. Pat. No. 5,054,355 issued on Oct. 8, 1991 to Tisse, et al. and entitled "Automatic glass cutting and positioning system"; U.S. Pat. No. 4,781,742 issued on Nov. 1, 1988 to Hill, et al. and entitled "Method and apparatus for detecting unwanted materials among cullet"; U.S. Pat. No. 4,489,870 issued on Dec. 25, 1984 to Prange, et al. and entitled "Apparatus for severing edges of a glass sheet"; and Re 30,147 reissued on Nov. 13, 1979 to Jordan, et al. and entitled "Method of coating a glass ribbon on a liquid float bath".

This invention as described hereinabove in the context of the preferred embodiments is not to be taken as limited to all of the provided details thereof, since modifications and variations thereof may be made without departing from the spirit and scope of the invention.

What is claimed is:

1. A glass substrate for a flat panel liquid-crystal display, such as for a laptop computer, the flat panel liquid-crystal display including a twisted nematic display, a supertwisted nematic display, an active matrix liquid-crystal display, a thin film transistor display, and a plasma addressed liquid-crystal display, said substrate comprising:

an alkali-free aluminoborosilicate glass;

said glass having a coefficient of thermal expansion $\alpha_{20/300}$ of between $2.8 \times 10^{-6}/K$ and $3.8 \times 10^{-6}/K$;

said glass having the composition (in % by weight, based on oxide):

| | |
|---|---|
| $SiO_2$ | >58–64.5 |
| $B_2O_3$ | >6–10.5 |
| $Al_2O_3$ | >18–24 |
| MgO | 0–<3 |
| CaO | 1–<8 |
| SrO | 0.1–1.5 |
| BaO | >5–8 |
| with SrO + BaO | ≦8.5 |
| with MgO + CaO + SrO + BaO | 8–18 |
| ZnO | 0–<2; | said glass being configured to be resistant to thermal shock;

said glass being configured to have a high transparency over a broad spectral range in the visible and ultra violet ranges; and said glass being configured to be free of bubbles, knots, inclusions, streaks, and surface undulations.

2. The glass substrate according to claim 1, wherein said glass substrate comprises a glass having a content of at least 0.1% by weight of ZnO.

3. The glass substrate according to claim 2, wherein said glass substrate comprises a glass having a glass transition temperature, $T_g$, of more than 700 degrees Celsius to maximize heat resistance of said glass substrate.

4. The glass substrate according to claim 3, wherein said glass substrate comprises a glass having (i.) and (ii.), wherein (i.) and (ii.) are:

(i.) a processing temperature, $V_A$, of at most 1350 degrees Celsius at a viscosity of $10^4$ dPas; and (ii.) a temperature of at most 1720 degrees Celsius at a viscosity of $10^2$ dPas.

5. The glass substrate according to claim 4, wherein said glass substrate comprises a glass having a content of more than 8% by weight of $B_2O_3$.

6. The glass substrate according to claim 5, wherein said glass substrate comprises a glass having a content of one of:
- at least 18% by weight of $Al_2O_3$;
- more than 18% by weight of $Al_2O_3$;
- at least 20.5% by weight of $Al_2O_3$; and
- at least 21.5% by weight of $Al_2O_3$.

7. The glass substrate according to claim 6, wherein said glass substrate comprises a glass containing additionally (in % by weight):

| | |
|---|---|
| $ZrO_2$ | 0–2 |
| $TiO_2$ | 0–2 |
| with $ZrO_2 + TiO_2$ | 0–2 |
| $As_2O_3$ | 0–1.5 |
| $Sb_2O_3$ | 0–1.5 |
| $SnO_2$ | 0–1.5 |
| $CeO_2$ | 0–1.5 |
| $Cl^-$ | 0–1.5 |
| $F^-$ | 0–1.5 |
| $SO_4^{2-}$ | 0–1.5 |
| with $As_2O_3 + Sb_2O_3 + SnO_2 + CeO_2 + Cl^- + F^- + SO_4^{2-}$. | $\leq 1.5$ |

8. The glass substrate according to claim 7, wherein said glass substrate comprises a glass in which arsenic oxide, antimony oxide, and inherent impurities are minimized.

9. The glass substrate according to claim 1, comprising at least one of (a.), (b.), (c.), (d.), (e.), (f.), (g.), (h.), and (i.), wherein (a.), (b.), (c.), (d.), (e.), (f.), (g.), (h.), and (i.) comprise:

(a.) a glass transition temperature, $T_g$, of more than 700 degrees Celsius to maximize heat resistance of said glass substrate;

(b.) a glass having (i.) and (ii.), wherein (i.) and (ii.) are:
  (i.) a processing temperature, $V_A$, of at most 1350 degrees Celsius at a viscosity of $10^4$ dPas; and
  (ii.) a temperature of at most 1720 degrees Celsius at a viscosity of $10^2$ dPas;

(c.) more than 8% by weight of $B_2O_3$;

(d.) one of: at least 18% by weight of $Al_2O_3$, more than 18% by weight of $Al_2O_3$, at least 20.5% by weight of $Al_2O_3$, and at least 21.5% by weight of $Al_2O_3$;

(e.) at least 0.1% by weight of ZnO:

(f.) additionally (in % by weight):

| | |
|---|---|
| $ZrO_2$ | 0–2 |
| $TiO_2$ | 0–2 |
| with $ZrO_2 + TiO_2$ | 0–2 |
| $As_2O_3$ | 0–1.5 |
| $Sb_2O_3$ | 0–1.5 |
| $SnO_2$ | 0–1.5 |
| $CeO_2$ | 0–1.5 |
| $Cl^-$ | 0–1.5 |
| $F^-$ | 0–1.5 |
| $SO_4^{2-}$ | 0–1.5 |
| with $As_2O_3 + Sb_2O_3 + SnO_2 + CeO_2 + Cl^- + F^- + SO_4^{2-}$ | $\leq 1.5$ |

(g.) a glass in which arsenic oxide, antimony oxide, and inherent impurities are minimized;

(h.) a float glass; and (i.) one of (I.) and (II.):
  (I.) a coefficient of thermal expansion $\alpha_{20/300}$ of from $2.8 \times 10^{-6}$/K to $3.6 \times 10^{-6}$/K; and
  (II.) a density, $\rho$, of $<2.600$ g/cm$^3$.

10. A glass comprising:
a substantially alkali-free aluminoborosilicate glass;
said glass having a coefficient of thermal expansion $\alpha_{20/300}$ of between $2.8 \times 10^{-6}$/K and $3.8 \times 10^{-6}$/K;
said glass having the composition (in % by weight, based on oxide):

| | |
|---|---|
| $SiO_2$ | >58–65 |
| $B_2O_3$ | >6–10.5 |
| $Al_2O_3$ | >14–25 |
| MgO | 0–<3 |
| CaO | 0–<9 |
| SrO | 0.1–1.5 |
| BaO | >5–8.5 |
| with SrO + BaO | $\leq 8.6$ |
| with MgO + CaO + SrO + BaO | 8–18 |
| ZnO | 0–<2. |

11. The glass according to claim 10, wherein said glass comprises at least 0.1% by weight of ZnO.

12. The glass according to claim 11, wherein said glass has a glass transition temperature, $T_g$, of >700° to maximize heat resistance of said glass.

13. The glass according to claim 12, wherein said glass has (i.) and (ii.), wherein (i.) and (ii.) are:
  (i.) a processing temperature, $V_A$, of $\leq 1350°$ C. at $10^4$ dPas; and
  (ii.) a temperature of $\leq 1720°$ C. at $10^2$ dPas.

14. The glass according to claim 13, wherein:
said glass is configured to be resistant to thermal shock;
said glass is configured to have a high transparency over a broad spectral range in the visible and ultra violet ranges; and
said glass is configured to be free of bubbles, knots, inclusions, streaks, and surface undulations.

15. The glass according to claim 14, wherein said glass comprises more than 8% by weight of $B_2O_3$.

16. The glass according to claim 15, wherein said glass comprises one of (i.), (ii.), (iii.), and (iv.):
  (i.) at least 18% by weight of $Al_2O_3$;
  (ii.) more than 18% by weight of $Al_2O_3$;
  (iii.) at least 20.5% by weight of $Al_2O_3$; and
  (iv.) at least 21.5% by weight of $Al_2O_3$.

17. The glass according to claim 16, wherein said glass additionally comprises (in % by weight):

| | |
|---|---|
| $ZrO_2$ | 0–2 |
| $TiO_2$ | 0–2 |
| with $ZrO_2 + TiO_2$ | 0–2 |
| $As_2O_3$ | 0–1.5 |
| $Sb_2O_3$ | 0–1.5 |
| $SnO_2$ | 0–1.5 |
| $CeO_2$ | 0–1.5 |
| $Cl^-$ | 0–1.5 |
| $F^-$ | 0–1.5 |
| $SO_4^{2-}$ | 0–1.5 |
| with $As_2O_3 + Sb_2O_3 + SnO_2 + CeO_2 + Cl^- + F^- + SO_4^{2-}$. | $\leq 1.5$ |

18. The glass according to claim 17, wherein said glass comprises a glass in which arsenic oxide, antimony oxide, and inherent impurities are minimized.

19. The glass according to claim 18, wherein said glass comprises a float glass.

20. The glass according to claim 10, comprising at least one of (a.), (b.), (c.), (d.), (e.), (f.), (g.), (h.), and (i.), wherein (a.), (b.), (c.), (d.), (e.), (f.), (g.), (h.), and (i.) comprise:

(a.) a glass transition temperature $T_g$ of >700° C. to maximize heat resistance of said glass;
(b.) a glass having (i.) and (ii.), wherein (i.) and (ii.) are:
 (i.) a processing temperature, $V_A$, of 1350° C. at $10^4$ dPas; and
 (ii.) a temperature of $\leq 1720$° C. at $10^2$ dPas
(c.) more than 8% by weight of $B_2O_3$;
(d.) one of: at least 18% by weight of $Al_2O_3$, more than 18% by weight of $Al_2O_3$, at least 20.5% by weight of $Al_2O_3$, and at least 21.5% by weight of $Al_2O_3$;
(e.) at least 0.1% by weight of ZnO;
(f.) additionally (in % by weight):

| | |
|---|---|
| $ZrO_2$ | 0–2 |
| $TiO_2$ | 0–2 |
| with $ZrO_2$ + $TiO_2$ | 0–2 |
| $As_2O_3$ | 0–1.5 |
| $Sb_2O_3$ | 0–1.5 |
| $SnO_2$ | 0–1.5 |
| $CeO_2$ | 0–1.5 |
| $Cl^-$ | 0–1.5 |
| $F^-$ | 0–1.5 |
| $SO_4^{2-}$ | 0–1.5 |
| with $As_2O_3$ + $Sb_2O_3$ + $SnO_2$ + $CeO_2$ + $Cl^-$ + $F^-$ + $SO_4^{2-}$ | $\leq 1.5$ |

(g.) a glass in which arsenic oxide, antimony oxide, and inherent impurities are minimized;
(h.) a float glass; and
(i.) one of (I.) and (II.):
 (I.) a coefficient of thermal expansion $\alpha_{20/300}$ of from $2.8 \times 10^{-6}$/K to $3.6 \times 10^{-6}$/K; and
 (II.) a density, $\rho$, of <2.600 g/cm$^3$.

* * * * *

UNITED STATES PATENT AND TRADEMARK OFFICE
CERTIFICATE OF CORRECTION

PATENT NO. : 6,852,658 B2
DATED : February 8, 2005
INVENTOR(S) : Ulrich Peuchert and Peter Brix It is certified that error appears in the above-identified patent and that said Letters Patent is hereby corrected as shown below:

Column 3,
Line 20, after "about" delete "$3.7 \times 10^{-6}$" and insert -- $3.7 \times 10^{-6}/K$ --.

Column 4,
Line 19, after "oxide", delete "($Al_2O_2$" and insert -- $Al_2O_3$ --.
Line 25, after "oxide", delete "(SrO)-barium" and insert -- (SrO)+barium --.
Line 64, after "of", delete "($Al_2O_2$)" and insert -- $Al_2O_3$, --.

Column 5,
Line 4, after "mum", delete "$B_2O_2$" and insert -- $B_2O_3$ --.
Line 7, after the second occurrence of "of", delete "$B_2O_2$." and insert -- $B_2O_3$. --.
Line 30, after "($\alpha_{20/300}$", delete ">" and insert -- < --.
Line 53, before "by", delete "$\pm 2.5\%$" and insert -- $\geq 2.5\%$ --.

Column 6,
Line 51, after "$BaCl_2$),", delete "F" and insert -- $F^-$ --.

Column 8,
Line 48, after "embodiments", delete "$<3.6 \times 10^{-6}K$," and insert -- $<3.6 \times 10^{-6}/K$, --.

Column 10,
Line 6, after "Institute", delete "füur" and insert -- für --.
Line 15, after "and", delete "$3.8 \times 10^{-}$" and insert -- $3.8 \times 10^{-6}/K$, --.
Line 16, before "which" delete "$_6/K$,".
Line 37, after "$B_2O_3 > 6$-", delete "10.57" and insert -- 10.5; --.

Column 16,
Line 39, delete "$\leq 8.5$" and insert -- $<8.5$ --.

Column 18,
Line 13, delete "0-<9" and insert -- 0-9 --.

UNITED STATES PATENT AND TRADEMARK OFFICE
CERTIFICATE OF CORRECTION

PATENT NO.   : 6,852,658 B2
DATED        : February 8, 2005
INVENTOR(S)  : Ulrich Peuchert and Peter Brix It is certified that error appears in the above-identified patent and that said Letters Patent is hereby corrected as shown below:

Column 19,
Line 4, after "of", delete "1350°C." and insert -- $\leq$1350°C. --.

Signed and Sealed this

Thirteenth Day of December, 2005

JON W. DUDAS
*Director of the United States Patent and Trademark Office*